Figure 1:
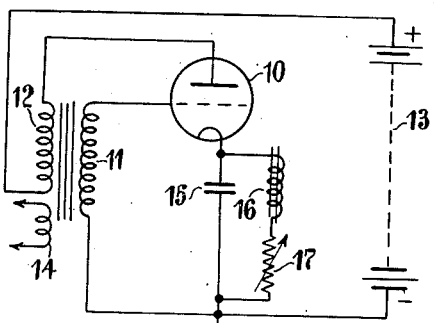

INVENTORS
CHARLES L. FAUDELL
E. L. C. WHITE
BY
ATTORNEY

Aug. 20, 1940.   C. L. FAUDELL ET AL   2,212,202
ELECTRONIC OSCILLATION GENERATOR
Filed Feb. 3, 1937    2 Sheets-Sheet 2

INVENTORS
CHARLES L. FAUDELL
E. L. C. WHITE
BY
H. S. Grover
ATTORNEY

Patented Aug. 20, 1940

2,212,202

UNITED STATES PATENT OFFICE 2,212,202

ELECTRONIC OSCILLATION GENERATOR

Charles Leslie Faudell, Acton, London, and Eric Lawrence Casling White, Hillingdon, England, assignors to Electric & Musical Industries Limited, Hayes, Middlesex, England, a company of Great Britain Application February 3, 1937, Serial No. 123,764
In Great Britain February 4, 1936

10 Claims. (Cl. 250—36)

This invention relates to electric oscillation generators and more particularly but not exclusively to generators of the kind known as relaxation oscillators. The invention is also more particularly concerned with relaxation oscillators of the blocking type.

A blocking oscillator usually comprises a thermionic valve having a grid coil coupled to a coil in the anode or screening grid circuit for the generation of oscillations, the oscillation set up being periodically blocked in such a manner that the anode-cathode path of the valve is alternately conducting and insulating. Blocking is achieved by providing a condenser, associated with a suitable leak, in the control-grid circuit, each burst of oscillations causing grid current to flow, the grid current causing the grid condenser to assume such a negative charge that the control grid is biased beyond anode-current cut-off; the charge on the grid condenser leaks away relatively slowly through the leak, and a new burst of oscillation takes place, the cycle being then repeated.

Blocking oscillators are employed for generating saw-tooth oscillations under the control of applied synchronizing impulses in television and like systems, and for many other purposes, and it has been found that blocking oscillators of the kind briefly described above are not entirely satisfactory for many of these purposes since the duration of each burst of oscillation occupies too long a time; in saw-tooth generators employing blocking oscillators, the time employed by each burst of oscillation of the blocking oscillator corresponds approximately to the return time of the saw-tooth oscillation and, of course, it is generally desirable that this return time should be as short as possible.

It is the chief object of the present invention to provide an improved oscillation generator with a view to overcoming this disadvantage.

According to the main feature of the present invention, an oscillation generator is provided, comprising a thermionic valve having its control grid and a further electrode inductively coupled for generating oscillations and a blocking circuit including a condenser and a leakage path therefor and wherein charging of the condenser for blocking purposes is effected not only as a result of the flow of current in the grid circuit, but also as a result of the flow of current in a further circuit.

The further circuit may comprise a circuit associated with the said valve or, alternatively, it may comprise a circuit associated with another valve or with other means for supplying current to the blocking condenser in addition to the grid current.

According to another feature of the invention, an oscillation generator is provided, comprising a thermionic valve having its control grid inductively coupled to a further electrode of said valve for the generation of oscillations and a blocking circuit comprising a condenser and a leakage path therefor, the blocking circuit being associated with the control grid and further electrode in such a manner that when oscillation occurs between said control grid and the electrode to which it is coupled, the flow of current to said further electrode causes said condenser to charge up, the potential difference set up across said condenser serving to bias the control grid to a potential such that current ceases to flow in said valve.

The further electrode aforesaid may be the anode of the valve and thus, by arranging that the blocking circuit condenser which is connected in the cathode lead is charged up by the flow of anode current, in addition to the grid current, it can be arranged that the oscillation is blocked in a much shorter time than when the charging is due to the flow of grid current only. Alternatively, the further electrode in some cases may comprise the screening grid of a screen grid valve, in which case charging of the blocking condenser is effected as a result of the flow of screen grid current in some cases in addition to the flow of anode current.

In some types of circuit in accordance with the invention, where a screen grid valve is employed, the anode current plays no part in the charging of the blocking condenser, charging of the condenser being effected as a result of the flow of screen grid current in addition to the control grid current.

It will be appreciated that the voltage developed across the blocking condenser is limited to a voltage not very much greater than that required to render the valve non-conducting, and since it is desirable to obtain a large output amplitude, particularly for electrostatic scanning, it is preferred, according to a further feature of the invention, to provide means which ensure that the bias applied to the control grid of the valve is only a small proportion of the voltage developed between cathode and earth. For this purpose, the coil which is provided in the control grid circuit which couples the control grid to the further electrode is connected to a tapping point in the cathode circuit which includes elements which cause the potential in the cathode circuit to be divided, whereby only a small part of the potential developed is applied to the control grid. Under these conditions, the blocking circuit may be regarded as being independent of the circuit providing the saw-tooth voltage.

Where it is necessary to provide means for initiating the bursts of oscillation, it is preferred to employ a three-coil transformer, two coils of which are employed for coupling the control grid and further electrode, whilst the third coil is employed to apply signals, which in the case of television will be synchronizing signals, to the control grid for initiating oscillation.

Where the circuit is arranged to feed potentials of saw-tooth wave form to, for example, electrostatic deflection plates of a cathode ray tube, it is preferred to arrange that the output of the oscillation generator is such that potential waves are generated which are opposite in phase and preferably equal in amplitude for application as push-pull potentials to the deflecting plates of the cathode ray tube.

According to a further feature of the invention an oscillation generator comprises a thermionic valve associated with a circuit in such a manner that the valve is adapted to be rendered periodically conducting and non-conducting, the circuit also being arranged to be fed with high tension current from a single source and to generate simultaneously impulses of equal magnitude but opposite phase. The generator may be arranged to charge two series condensers in opposite phase and to cause the charges on the condensers to be periodically removed and whereby a potential of a substantially saw-tooth wave form is derived from the condensers for application to, for example, the deflecting electrodes of a cathode ray tube. Alternatively, a single condenser may be provided, the plates of which are arranged to vary in potential by equal amounts, but in opposite senses, generating saw-tooth waves for the purpose aforesaid. The discharge of the pair of condensers or of the single condenser may take place by means of a so-called blocking oscillator or by means of a gas discharge valve or equivalent vacuum valve circuit.

Figure 2:
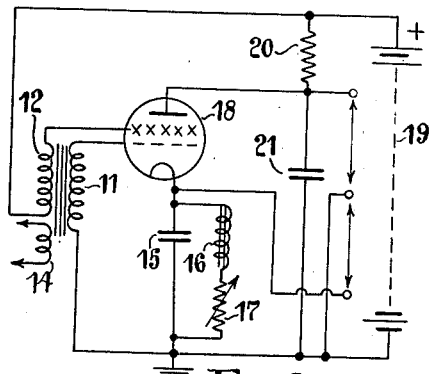
Figure 3:
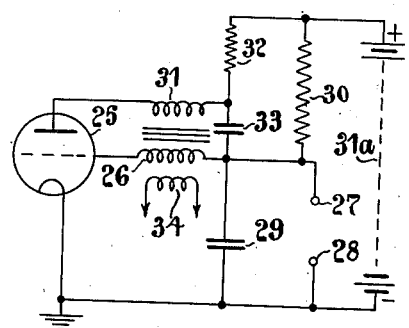
Figure 4:
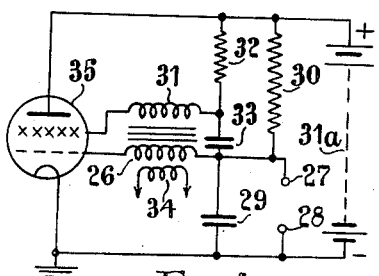
Figure 5:
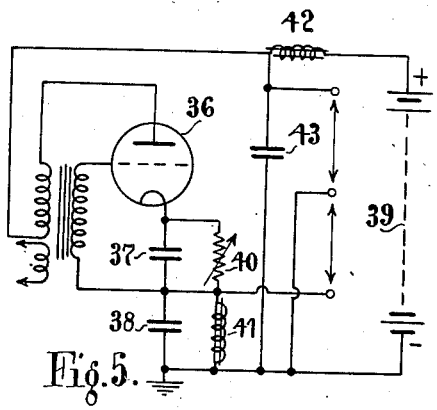
Figure 6:
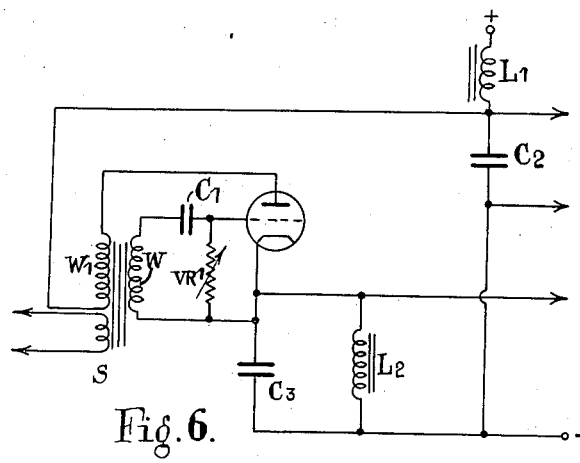

In order that the said invention may be clearly understood and readily carried into effect, the same will now be more fully described with reference to the accompanying drawings in which:

Fig. 1 illustrates an oscillation generator according to one embodiment of the invention, Fig. 2 is a circuit similar to that shown in Fig. 1 which is arranged to generate potential waves of equal magnitude but opposite phase, Fig. 3 illustrates a modified form of the invention, Fig. 4 illustrates a circuit similar to that shown in Fig. 3 but employing a screen grid valve, and, Fig. 5 illustrates a further embodiment of the invention, Figure 6 indicates a further circuit constructed in accordance with the invention for obtaining a "push-pull" output.

Figure 7:
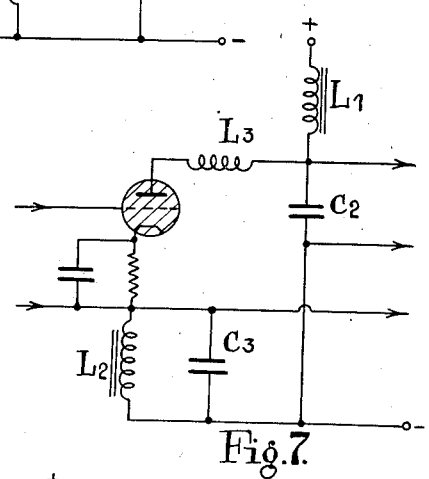
Figure 8:
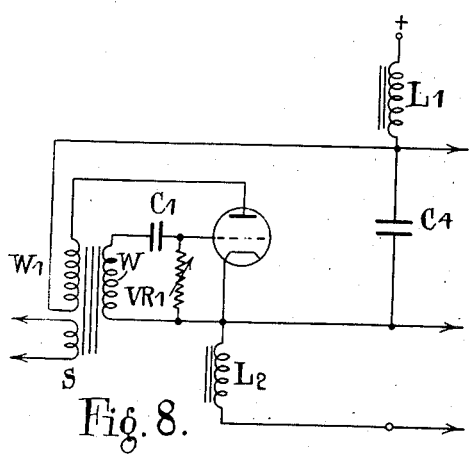

Figure 7 illustrates a similar circuit but employing a gas discharge valve, whilst, Figure 8 illustrates a circuit similar to that shown in Fig. 6, but employing only a single condenser from which operating potentials are derived.

Referring now to Fig. 1 of the drawings, a triode valve 10 has its control grid connected to earth through one winding 11 of a three-coil iron-cored transformer, a second winding 12 of which is connected between the anode and the positive terminal of a source of anode current indicated by a battery 13, the negative terminal of which is earthed, the third winding 14 of the transformer is connected to a suitable source of controlling signals. The coupling between the control grid and anode circuits afforded by the transformer is close so that powerful oscillations are generated.

The cathode of the valve is connected to earth through a blocking circuit comprising a condenser 15 shunted by an iron-cored choke coil 16 and a variable resistance 17 in series. When a burst of oscillations takes place in the valve, the anode current, as well as the control grid current, serve to charge the condenser, the magnitude of the potential difference set up across the condenser being determined by the time during which these currents flow and being dependent upon the anode-to-grid coupling. The oscillation is then blocked, and during the remainder of the cycle of operation, the condenser discharges through the choke and resistance by which it is shunted. It should be borne in mind the triode valve employed in this arrangement may be replaced by one of the screen grid type, in which case the screen grid current also contributes to the charging of the condenser.

The choke 16 is given such a value that it is effective in maintaining a substantially constant discharge current, so that the rate of decay of the potential difference across the condenser 15 is substantially constant. A voltage of rectilinear saw-tooth wave-form is thus set up across the condenser 15 and this voltage may be fed directly to a deflecting circuit of a cathode ray tube, for example. Alternatively, the choke 16 may be replaced by a primary winding of a step-up output transformer, a substantially saw-tooth voltage wave being then set up across the secondary winding; such an arrangement is simple and reliable in operation owing to the relatively low impedance of the blocking circuit, that is to say, the circuit from which the saw-tooth voltage is taken.

The maximum value of the variable resistance 17 is so chosen, taking into account the resistance of the choke 16 with which it is in series, that the valve is readily able to oscillate, and the capacity of the blocking circuit condenser is made such that the natural period of the circuit is slightly longer than the interval between successive controlling signals. It should be noted that, while variation in the value of the resistance changes, this natural period of the oscillator circuit, such a variation is found to have substantially no influence upon the amplitude of the saw-tooth voltage set up across the condenser. Furthermore, it is found that the frequency of the saw-tooth voltage remains substantially constant over a wide range of variation of anode voltage.

In the arrangement described in Fig. 1 for the generation of a saw-tooth oscillation of a frequency of 10,000 cycles per second, the elements of the blocking circuit may have the following approximate values: the condenser 15 may have a capacity of 0.01 microfarad, the variable resistance 17 a maximum value of 10,000 ohms and the choke 16 an inductance of 5 henries and an internal resistance which is preferably not greater than 5,000 ohms.

When it is desired to generate a saw-tooth oscillation of a low frequency, for example about 10 cycles per second, it may be found desirable to employ a resistance of a relatively large value, in order to avoid the necessity for the use of a choke of an inconveniently high inductance, and to ensure that discharge of the condenser can take place at a substantially uniform rate. By way of example, the condenser may have a value of 0.5 mfd., while the leak resistance is 2.0 megohms. Means are then preferably provided for biasing the control grid to a positive potential so that the large cathode resistance does not prevent the valve from oscillating. The value of the applied positive bias may be made adjustable to afford a control of the extent to which the condenser must discharge before oscillation can take place, and hence of the frequency of the saw-tooth oscillation.

The value which the condenser should have at high frequencies tends to become small, and comparable in magnitude with the stray capacities. It is accordingly preferred to employ a condenser of a larger capacity than that necessitated by the working frequency, and to provide means for giving the grid a positive bias to enable the circuit to oscillate before the whole of the charge has leaked away from the condenser.

Since the blocking condenser 15 is charged as a result of the flow of anode current, in addition to the flow of grid current, the period of oscillation can be blocked in a much shorter time compared with the known arrangements in which blocking is effected solely as a result of the flow of grid current.

Fig. 2 of the drawings illustrates a circuit similar to that shown in Fig. 1, in which a screen grid valve having pentode characteristics is employed and in which potential waves equal in magnitude but opposite in phase are obtained. As shown 18 indicates the screened grid valve (or a pentode valve may be used) the control and screening grids being coupled together by a transformer similar to that shown in Fig. 1, for the generation of oscillations, and the anode is connected to the positive terminal of the anode current source indicated by battery 19 through a resistance 20. The cathode is connected to earth through a blocking circuit of the form described above comprising condenser 15 shunted by an iron-cored choke coil 16 and a variable resistance in series, and the anode is connected to earth through a condenser 21. The time constant of condenser 21 and resistance 20 is made substantially equal to that of the blocking circuit, and the voltage waves set up on the anode and cathode of the valve, with respect to the earth, are opposite in sense and can be made equal in magnitude. These voltage waves may be fed to the deflecting circuits of a cathode ray tube either directly or through suitable amplifiers. In the circuit shown in Fig. 2 the anode current and screen grid current, in addition to the control grid current, contribute to the charging of the blocking condenser 15 in accordance with the main feature of the invention.

Fig. 3 illustrates a modified circuit according to the invention. As shown a triode valve 25 has its control grid connected through one winding 26 of a three-coil iron-cored transformer to an output terminal 27 and its cathode connected to a second output terminal 28 which is earthed; a condenser 29 is connected between the output terminals 27 and 28 and the side of condenser 29 which is remote from the cathode is connected through a leak resistance 30 to the positive terminal of a source of anode current indicated by a battery 31a having its negative terminal earthed. Alternatively, resistance 30 may be shunted across the condenser 29.

The anode of the valve is connected through a second winding 31 of the transformer and a resistance 32 in series to the positive terminal of the source, and the anode end of resistance 32 is connected through a decoupling condenser 33 to the control grid side of condenser 29. The third winding 34 of the transformer is connected to a suitable source of controlling signals.

When a burst of oscillation occurs, anode current flows in the valve. Condenser 29 is charged negatively as usual by the flow of grid current. Owing to the connection of the decoupling condenser 33 to the grid side of condenser 29, the latter condenser supplies the impulse of anode current and its negative charge is thus increased above that provided by the grid current. The mean negative potential set up across condenser 29, with respect to cathode, thus rapidly reaches a value greater than that corresponding to anode-current cut-off; the oscillation is thus blocked and the charge on condenser 29 is then neutralised by the flow of current from the source through resistance 30, and the cycle recommences.

A voltage wave of saw-tooth form is thus set up across condenser 29 and, as has been pointed out, since the anode current as well as the grid current contributes to the charging of condenser 29, the return time of the saw-tooth wave can be made much shorter than in known blocking oscillators. In order to reduce the tendency for the forward stroke to be of exponential form, a choke may be connected in series with, or in place of, resistance 30.

For the generation of a saw-tooth wave of a frequency of 10,000 cycles per second, the following values are found to be suitable:

| | |
|---|---|
| Condenser 29 microfarad | 0.01 |
| Condenser 33 do | 0.1 |
| Resistance 30 ohms | 250,000 |
| Resistance 32 do | 100,000 |

Resistances 30 and 32 may be made adjustable and the anode and control grid circuit chokes, i. e. the windings 26 and 31 may each have an inductance of 2.0 milli-henries. In such a circuit, a return time of less than 10 microseconds is obtainable.

In a modification of this form of the invention, the third coil 34 of the transformer is omitted and controlling signals are applied across a resistance connected between the cathode of the valve and earth; this resistance may have a value of the order of 1000 ohms, and may be connected in series with, or, if desired, replaced by, a choke of suitable inductance, the choke serving to maintain the flow of grid current and tending to increase the amplitude of the saw-tooth wave generated.

In a further modification as shown in Fig. 4, a circuit similar to that illustrated in Fig. 4 is used but in which a valve 35 of the screen grid type is employed. The anode is connected directly to the positive terminal of the source of anode current indicated by a battery 31a, and the screening grid then takes the place of the anode in the arrangement shown in Fig. 3. In such a generator, the screen grid current, but not the anode current contributes to the charging of the blocking condenser.

An important practical advantage of generators shown in Figs. 3 and 4 is that since the forward stroke of the saw-tooth wave is represented by a decrease in the negative potential across condenser 29, the saw-tooth wave may be applied directly to the control grid of a power output valve, feeding deflecting coils of a cathode ray tube. The application of the saw-tooth potential to the output valve in the sense mentioned is necessary if a large saw-tooth current is required in the coils since if it is applied in the opposite sense, the desired abrupt change of anode current at the return stroke is prevented by the inductive anode load of the output valve.

In the embodiments shown in Figs. 1 to 4, the voltage developed across the blocking condenser is limited to a voltage not very much greater than that corresponding to anode current cut-off. Fig. 5 of the drawings shows an arrangement in accordance with a feature of the invention in which the voltage applied to the control grid to block the oscillations is only a small proportion of the voltage developed between cathode and earth, the grid of the valve being connected to a tapping point in the cathode circuit.

As shown in Fig. 5, the grid and anode of a triode valve 36 are coupled through the medium of transformer windings similar to the arrangement described in connection with Fig. 1, a third winding of the transformer being employed for applying synchronising pulses to the circuit. Between the cathode of the valve and the negative terminal of an associated source of anode current indicated by battery 39, two condensers 37 and 38 are connected in series which are respectively shunted by a variable resistance 40 and an iron-cored choke coil 41. It will be seen that the end of the winding of the transformer remote from the end connected to the control grid of the valve 36 is connected to the junction of the two condensers, which junction constitutes the said tapping point.

With the construction described in Fig. 5 only a small percentage of the voltage developed between the cathode and the high tension negative lead is applied to the control grid, thus enabling a higher voltage to be developed in the whole of the cathode circuit which may be fed directly to, for example, a deflecting circuit of a cathode ray tube.

Where it is desired to obtain output voltages which are equal in magnitude and opposite in phase, an iron cored choke coil 42 is inserted in series between the anode coil of the transformer and the positive terminal of the high tension current, a condenser 43 being connected between the anode end of the choke 42 and the high tension negative lead. In this construction the inductances of 41 and 42 are of similar value and the capacities of the condensers 43 and 38 are adjusted so that the voltage waves set up across the condenser plates are equal in magnitude and opposite in phase, the condenser 37 being sufficiently large to constitute a bypass for the current which flow from condenser 43 into condenser 38 when the valve is conducting. The outputs in opposite phase are taken from the two condensers 43 and 38. The inductances 41 and 42 are preferably of low resistance whereby high output voltages can be obtained with comparatively small high tension voltages.

In some cases the inductances 41 and 42 may be replaced by large value resistances which may be desirable for eliminating high inductances which would be required at low frequencies. The time constants of the condensers 43 and 38 and the resistances are suitably adjusted to generate the required linear wave form.

If desired, instead of employing the triode valve shown in Fig. 5 a screen grid valve may be employed as shown in Figs. 2 and 4.

Figure 6 illustrates a circuit arrangement of a blocking oscillator similar to that described in Fig. 7. As shown, the control grid of a triode valve is connected to one winding W of a three coil iron cored transformer through a condenser C1, the other end of the coil being connected to the cathode, a variable resistance VR1 being shunted across the control grid and cathode as shown. The second winding W1 of the transformer is connected in the anode circuit of the valve whilst the third winding S of the transformer may be connected to a suitable source of controlling signals for enabling the initiation of the bursts of oscillations to be controlled. An iron cored choke coil L1 is inserted in series between the anode coil and the positive terminal of the high tension current, a condenser C2 being connected between the anode end of the choke L1 and the high tension lead which is connected through a condenser C3 shunted by an iron cored choke coil L2 to the cathode of the valve. In this construction the inductance of L1 and L2 are of similar value and the capacities of the condensers C2 and C3 are adjusted so that the voltage waves set up across the condenser plates are equal in magnitude and opposite in phase. On a synchronising signal being passed through the coil S, oscillation of the valve is initiated and the oscillation is then blocked owing to a charge accumulating on the condenser C1 biasing the grid of the valve to a point more negative than that corresponding to anode current cutoff. The charge on condenser C1 leaks away through the resistance VR1 and during this period the charge on condenser C3 falls linearly in potential whilst the condenser C2 charges linearly through the inductance L1. When the valve again conducts on receipt of the synchronising signal the condensers C2 and C3 are effectively short-circuited so that the potential across the condenser C2 falls and the potential across C3 rises. The operation of the circuit, therefore, generates impulses of equal magnitude but opposite phase from a single source of high tension current connected to the positive and negative terminals of the circuit shown in Figure 1.

Figure 7 of the drawings illustrates the invention as applied to a circuit employing a gas discharge valve such as a valve known by the registered trade-mark "Thyratron." In this arrangement synchronising signals are applied to the control grid and the cathode whilst the anode of the valve is connected to the positive terminal of the single source of high tension current through an iron cored choke coil L1, a condenser C2 being connected between the anode end of the choke L1 and the high tension negative lead which is connected to the cathode of the valve through an iron cored choke coil L2 shunted by a condenser C3. The circuit shown in Figure 7 serves to generate impulses of equal magnitude but opposite phase, which are fed to, for example, deflecting electrodes from the condensers C2 and C3. An inductance L3 is inserted in the anode circuit of the valve so as to limit the current through the valve and, in addition, this inductance and the condensers C2 and C3 form with the discharge path of the valve an oscillatory circuit whereby the voltage swing on the condensers C2 and C3 is approximately doubled. This latter effect is also obtained with the blocking oscillator of Figures 5 and 6 and with the circuit shown in Figure 8 hereinafter to be described, since the leakage inductance of the transformer acts in the same manner as the inductance in series with the anode of the valve shown in Figure 7. The condensers C2 and C3 of Figures 6 and 7 may be replaced by a single condenser as shown in Figure 8. The circuit shown in this figure is similar to that shown in Figure 6, with the exception that the condensers C2 and C3 are omitted and a single condenser C4 is bridged across the anode and cathode leads as shown. In this arrangement the plates of the condenser vary in potential by equal amounts in opposite senses as desired.

The inductances L1 and L2 referred to above are preferably of low resistance whereby high output voltages can be obtained with comparatively small high tension voltages. In some cases the inductances L1 and L2 may be replaced by large value resistances which may be desirable for eliminating high inductances which would be required at low frequencies. The time constants of the condensers C2 and C3 and the resistances are suitably adjusted to generate the required linear wave form.

If desired, instead of employing triode valves in the circuits described with reference to Figures 6 and 7 screen grid valves may be employed.

We claim:

1. A relaxation oscillation generator of a blocking type, comprising a thermionic valve having a cathode, a control grid and a further electrode, means for periodically blocking the valve including an inductive coupling means between the control grid and the further electrode, a condenser-impedance circuit having a substantially constant rate of decay of potential connected between the control grid and the cathode, said circuit being included in the current path between the further electrode and cathode whereby the flow of current from both the control grid and the further electrode charge the condenser and means to derive a saw tooth potential from across the condenser.

2. An oscillation generator as in claim 1, wherein the condenser of the blocking circuit is connected between the cathode of the valve and earth, the impedance comprises an inductance and resistance in series, and the control grid cathode circuit is completed by a connection from earth to the grid circuit.

3. An oscillation generator as in claim 1, wherein the further electrode of said valve is connected to the positive terminal of a source of current through an impedance, the negative terminal of the source being connected to the cathode of the valve and the said blocking condenser is connected to the cathode of said valve between the negative terminal of said source and the control grid and the side of the impedance element connected to the further electrode is connected by a decoupling condenser to the side of the blocking condenser connected to the control grid.

4. An oscillation generator claimed in claim 1 and comprising in addition an impedance network connected in series with the said condenser impedance circuit and the further electrode, whereby the control grid is maintained at a potential with respect to the cathode determined by the potential across the condenser impedance circuit.

5. An oscillation generator as in claim 1, wherein the condenser impedance circuit has in series therewith a further condenser, the further condenser being shunted by an inductance and the control grid of said valve being connected to the junction between the two condensers whereby the potential applied to said control grid is only the potential developed across the cathode impedance circuit, said further condenser and inductance being included in the current path between the further electrode and cathode.

6. An oscillation generator as in claim 1, wherein the further electrode is an anode and a condenser is provided connected between the anode and cathode of said valve across which a potential is developed which is in opposite phase to the potential developed across the condenser in said condenser-impedance circuit.

7. An oscillation generator as in claim 1, wherein the further electrode is an anode and a further condenser is provided connected between the anode and cathode of said valve, across which a potential is developed which is opposite in phase to the potential developed across the condenser in the condenser-impedance circuit, a charging impedance connecting the anode of said valve to an associated source of anode current, said charging element being of such a magnitude compared with an impedance shunting said blocking condenser that the oppositely phased potentials are equal in magnitude.

8. An oscillation generator as in claim 1, wherein the further electrode is an anode and the anode of the valve is connected to the positive terminal of the associated source of anode current through an inductance and a condenser is provided between the anode and cathode of said valve whereby voltage waves of opposite phase with respect to the negative terminal of the source of anode current are generated at the anode of said valve and at the junction between two series condensers provided in the cathode circuit.

9. In a blocking grid oscillator wherein a thermionic valve having a cathode, a grid and further electrode is provided with self-biasing means, the method of operation which includes the steps of feeding a flow of current from both the grid and the further electrode through the biasing means to develop a potential thereacross, interrupting the flow of current from both the grid and the further electrode during the time the developed potential reaches a predetermined value and subsequently reducing the potential at a substantially constant rate to a predetermined minimum value.

10. An oscillation generator comprising a thermionic valve having a cathode, control electrode, and a further electrode, a series circuit between said further electrode and said cathode comprising an inductance and a first, second, and third condenser, a series circuit between said control electrode and said cathode comprising one of said condensers and a second inductance coupled with said first named inductance, a resistance shunting said condenser common to each of said series circuits, an impedance shunting the second of said condensers, a source of potential and an impedance in series shunting said third condenser, and a plurality of output terminals connected across said last two mentioned condensers.

CHARLES LESLIE FAUDELL.
ERIC LAWRENCE CASLING WHITE.